United States Patent [19]

Hertel et al.

[11] 4,103,074

[45] Jul. 25, 1978

[54] PROCESS FOR COAGULATING POLYMER LATICES USING SCREW-TYPE EXTRUDER

[75] Inventors: Douglas Leo Hertel, Strongsville; Robert Wen Lee, North Ridgeville, both of Ohio

[73] Assignee: International Basic Economy Corporation, New York, N.Y.

[21] Appl. No.: 742,077

[22] Filed: Nov. 15, 1976

[51] Int. Cl.$^2$ .............................................. C08C 1/14
[52] U.S. Cl. ................................ 528/487; 260/821; 528/485; 528/488; 528/493; 528/496
[58] Field of Search .................... 260/821, 29.7 PT; 528/502, 485, 487, 488, 493, 496

[56] References Cited

U.S. PATENT DOCUMENTS

| | | | |
|---|---|---|---|
| 2,371,722 | 3/1945 | Wanderer | 18/48 |
| 2,469,827 | 5/1949 | Johnson | 528/485 |
| 2,491,519 | 12/1949 | Rose | 528/485 |
| 2,609,753 | 8/1952 | Adams | 528/487 |
| 2,997,943 | 8/1961 | Zies | 100/74 |
| 3,108,983 | 10/1963 | Barclay | 260/33.6 |
| 3,112,288 | 11/1963 | Davis | 528/487 |
| 3,222,797 | 12/1965 | Zies | 34/17 |
| 3,248,455 | 4/1966 | Harsch | 528/502 |
| 3,311,601 | 3/1967 | Conley | 528/493 |
| 3,345,430 | 10/1967 | Simon | 260/876 |
| 3,638,921 | 2/1972 | Bredeson | 259/109 |
| 3,814,563 | 6/1974 | Slaby | 425/203 |
| 3,887,532 | 6/1975 | Neubert | 528/485 |
| 3,993,292 | 11/1976 | Skidmore | 259/193 |

*Primary Examiner*—Paul R. Michl
*Attorney, Agent, or Firm*—Robert R. Jackson

[57] ABSTRACT

A polymer latex is coagulated by passing the polymer latex and a coagulant through a screw-type extruder in which the latex and coagulant are mixed and mechanically worked under pressure by a rotating interrupted worm flight in cooperation with a plurality of stationary breaker members. At the downstream end of the extruder, the coagulated polymer is compacted and extruded. The extruded polymer is characterized by relatively low moisture content, and the excess process liquid which drains from the compacted polymer is relatively free of uncoagulated polymer.

16 Claims, 2 Drawing Figures

PROCESS FOR COAGULATING POLYMER LATICES USING SCREW-TYPE EXTRUDER

BACKGROUND OF THE INVENTION

This invention relates to processes for coagulating polymer latices, and more particularly to processes for coagulating such latices using a screw-type extruder.

As used herein, the term "polymer latex" means an emulsion of a polymer in an aqueous medium. The polymer may be either a conventional synthetic rubber polymer such as a styrene-butadiene rubber (SBR), a polychloroprene rubber (neoprene), an acrylonitrile-butadiene rubber (nitrile rubber), etc.; a conventional naturally occurring rubber latex such as a hevea rubber, a balata rubber, a gutta percha rubber, a guayule rubber, etc.; a conventional plastic polymer such as an acrylonitrile-butadiene-styrene resin (ABS resin), etc.; or a mixture or any other combination thereof such as an ABS-extended SBR; and as used herein, the term "polymer" means any of the foregoing materials. The term "rubber latex" as used herein means a latex of a conventional rubber polymer such as an SBR, neoprene, nitrile, hevea, balata, gutta percha, guayule, etc., which is used to make rubber. The "solids content" of a polymer latex refers to the weight percent of polymer and other solids in the latex.

A polymer latex is generally the product of an emulsion polymerization of a polymerizable material, although in the case of naturally occurring rubber latices, the latex is the product of a primarily natural process. The polymer is recovered from the polymer latex by coagulating the latex. This is accomplished by mixing the polymer latex with a coagulant which breaks down the emulsion of the polymer. Any of a wide variety of conventional coagulants can be used for this purpose. Known coagulants include electrolytes such as acids, salts, and aqueous solutions of acids and salts. Suitable aqueous acids are aqueous $H_2SO_4$, $HCl$, $H_3PO_4$, $HC_2H_3O_2$, and the like. Aqueous $H_2SO_4$ is particularly preferred for coagulating rubber latices, and particularly SBR. Suitable aqueous salt solutions are solutions of $Ca(NO_3)_2$, $Al_2(SO_4)_3$, $NaCl$, and the like. Other known coagulants are organic solvents such as ketones (e.g., acetone), alcohols (e.g., ethyl alcohol, methyl alcohol, etc.), and mixtures thereof. Mixtures of electrolytes and organic solvents (e.g., an emulsion of an alcohol in an electrolyte) may also be used as coagulants.

In the coagulation of polymer latices, complete coagulation of the latex is the desired objective. The amount of coagulant required to produce complete coagulation may be an important consideration in the economics of the coagulation process. Polymer latices which are easy to coagulate are frequently difficult to completely coagulate. This is because the rapidly coagulating polymer encapsulates or otherwise traps uncoagulated latex and prevents coagulant from contacting the encapsulated latex as is required to complete coagulation. Neoprene is an example of a polymer which is particularly troublesome in this respect.

It is also desirable to produce a coagulated polymer with low moisture content since this facilitates handling and further processing of the polymer. Many known coagulation processes produce coagulated polymer with relatively high moisture content, e.g., 40–50% moisture by weight. The excess liquid of the coagulation process (i.e., the liquid which separates from the coagulated polymer) should also be relatively low in polymer since it is typically uneconomical to attempt to recover any polymer from this liquid and this polymer is therefore usually lost. In other words, the coagulation process preferably gives good separation between the coagulated polymer and the excess process liquid.

It may also be desirable to produce coagulated polymer which has been compacted and agglomerated since this promotes separation of the coagulated polymer from the excess process liquid and facilitates further handling of the polymer.

In view of the foregoing, it is an object of this invention to provide improved processes for coagulating polymer latices.

It is a more particular object of this invention to provide processes for coagulating polymer latices which assure substantially complete coagulation of the polymer in the latex.

It is another more particular object of this invention to provide processes for coagulating polymer latices which reduce the amount of coagulant required for complete coagulation of the polymer in the latex.

It is still another more particular object of this invention to provide processes for coagulating polymer latices which give good separation between the coagulated polymer and the excess process liquid, which produce compacted coagulated polymer having relatively low moisture content, and excess process liquid which is relatively low in uncoagulated polymer.

SUMMARY OF THE INVENTION

These and other objects of the invention are accomplished in accordance with the principles of the invention by passing the polymer latex and coagulant through a screw-type extruder including an elongated chamber having a downstream extruder exit, an axial rotating interrupted worm flight disposed in the chamber for advancing material in the chamber to the extruder exit, and a plurality of stationary breakers projecting into the interior of the chamber intermediate at least some of the segments of the interrupted worm flight. The polymer latex and coagulant are introduced into the upstream portion of the extruder under pressure, preferably by injection through breaker bolts, and are mixed by the rotating interrupted worm flight to form a pressurized coagulating mixture. The coagulating mixture is advanced toward the extruder exit by the rotating interrupted worm flight. The worm flight and the breakers cooperate to maintain the advancing coagulating mixture under pressure at least until coagulation of the polymer latex is substantially complete. The segments of the interrupted worm flight and the breakers also cooperate to thoroughly and intimately mix and mechanically work the constituents of the pressurized coagulating mixture. In particular, the worm flight segments and breakers work the coagulating mixture to either prevent the formation of any structures of coagulated polymer which may encapsulate uncoagulated latex or break down any such structures which may have formed. All of the polymer latex is thereby contacted with coagulant. The pressure in the extruder chamber promotes adequate working of the coagulating mixture by forcing coagulated masses against one another and against the worm flight segments and breakers.

At the end of the interrupted worm flight and prior to the extruder exit the coagulated polymer is preferably compacted and agglomerated. For this purpose the extruder exit is preferably constricted. The coagulated polymer is then extruded via the extruder exit and the excess process liquid drains freely away from the coagulated polymer. Because the polymer has been completely coagulated and also preferably compacted, the extruded polymer has relatively low moisture content. Also, the excess process liquid is relatively low in uncoagulated polymer solids.

Further objects of the invention, its nature, and various advantages will be more apparent from the accompanying drawing and the following detailed description of the invention.

DETAILED DESCRIPTION OF THE INVENTION

Figure 1:
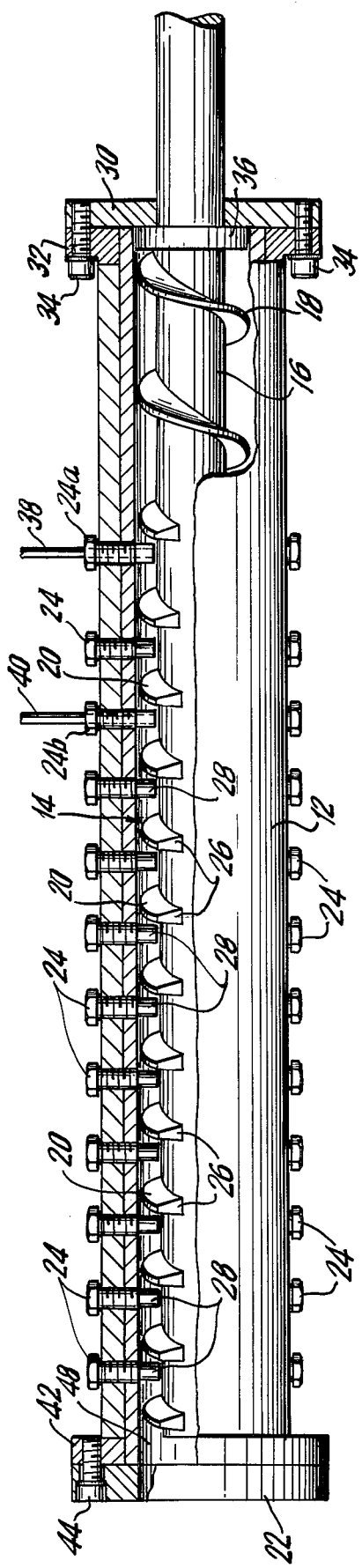
FIG. 1 is a partly sectional plan view of illustrative screw-type extruder apparatus suitable for carrying out the process of this invention.

As shown in FIG. 1, illustrative extruder apparatus for carrying out the process of this invention includes an elongated cylindrical chamber 12 (shown partially cut away in FIG. 1) with an axial feed worm or screw 14 concentrically disposed therein. Screw 14 includes a central shaft 16 with a helical worm flight mounted thereon. The initial portion 18 of this worm flight is continuous and has a relatively high pitch. This continuous portion of the worm flight is relatively short, extending for approximately 1½ turns around shaft 16. The remaining (and major) portion of the worm flight is an interrupted worm flight made up of a plurality of helical interrupted worm flight segments 20. Interrupted worm flight segments 20 may be all of approximately the same pitch, or they may decrease in pitch toward the exit end 22 of the extruder. This decrease in pitch may be either gradual or by stages. In the particular embodiment shown in the drawing, the first interrupted worm flight segment is of relatively high pitch, the last segment is of relatively low pitch, and the intermediate segments are of intermediate pitch. At least the major portion of interrupted worm flight segments 20 are preferably of lower pitch than continuous initial portion 18.

Although screw 14 includes only a single helical worm flight as shown in the drawing, it will be understood that multiple helical worm flights may be provided on all or selected portions of shaft 16. For example, similar segments of multiple interrupted worm flights may be circumferentially spaced on each longitudinal segment of shaft 16 intermediate adjacent breaker bolts 24.

A plurality of breaker bolts 24 are mounted in chamber 12 to project into the interior of the chamber intermediate at least some, preferably a majority or all, of interrupted worm flight segments 20. In the particular embodiment shown in the drawing, two diametrically opposed longitudinal rows of breaker bolts are provided along the length of chamber 12, a respective one of the breaker bolts in each row projecting into the interior of the chamber intermediate each adjacent pair of interrupted worm flight segments 20. Additional breaker bolts may be provided (generally in longitudinal rows spaced circumferentially around chamber 12) if desired. Although breaker bolts are shown as the stationary breaker members projecting into the interior of chamber 12 in the illustrative apparatus of the drawing, it will be understood that any other type of stationary breaker members can be employed if desired. For example, breakers welded to the interior of chamber 12 can be substituted for breaker bolts 24.

The leading and trailing portions of adjacent interrupted worm flight segments 20 are spaced longitudinally along shaft 16 to permit the projecting portions 28 of breaker bolts 24 to pass therebetween when shaft 16 is rotated about its longitudinal axis. However, the clearances between the leading and trailing portions of the worm flight segments and the adjacent breaker bolts are preferably relatively small (i.e., of the same order of magnitude as a typical diameter of structures of coagulated polymer which may form in the coagulating mixture and encapsulate uncoagulated latex, and more preferably less than such a typical diameter) to promote adequate working of the coagulating mixture between opposing surfaces of the breaker bolts and interrupted worm flight segments. Worm flight segments 20 are also preferably provided with sharp leading and blunt trailing edges (only trailing edges 26 are visible in FIG. 1) to further promote the working of the coagulating mixture.

Chamber 12 is stationary and preferably substantially horizontal, being supported by suitable mounting means (not shown). Shaft 16 is supported for rotation about its longitudinal axis by one or more bearing boxes (not shown) disposed along the length of the portion of shaft 16 projecting from the upstream end of chamber 12. This bearing apparatus also prevents axial motion of shaft 16. Shaft 16 is rotated by any suitable drive means (not shown), for example, an electric motor. The upstream end of chamber 12 is closed by upstream closure plate 30 bolted to flange 32 on the upstream end of chamber 12 by bolts 34. Shaft 16 passes through an aperture in upstream closure plate 30. This aperture permits shaft 16 to rotate freely. Sealing collar 36 is mounted on shaft 16 inside chamber 12 adjacent upstream closure plate 30 to seal the upstream end of the apparatus by contact with closure plate 30 and thereby substantially prevent the escape of any materials from the upstream end of the extruder.

The polymer latex to be coagulated and the coagulant are introduced into chamber 12 at points along the length of the chamber which are selected to provide thorough and complete mixing and working of these materials in the chamber in accordance with the principles of this invention. Apertures or nozzles specially devoted to this purpose may be provided in chamber 12. Alternatively, it has been found convenient to employ breaker bolts such as 24a and 24b in FIG. 1 which have been axially bored through to provide a means for introducing the polymer latex and coagulant into chamber 12. The head portions of breaker bolts 24a and 24b may be tapped to accept male fittings at the ends of fluid supply lines 38 and 40, respectively. Breaker bolts 24a and 24b are interchangeable with any unmodified breaker bolts, thereby facilitating relocation of the points at which the polymer latex and coagulant are introduced into chamber 12.

Either the polymer latex or the coagulant may be introduced upstream of the other. The liquids are introduced into the extruder under pressure provided by pumps (not shown) in fluid supply lines 38 and 40. Shaft 16 is rotated as mentioned above so that surfaces 26 are the trailing edges of interrupted worm flight segments 20. Screw 14 therefore mixes the latex and coagulant and forwards the resulting coagulating mixture from right to left as viewed in FIG. 1 toward the extruder exit orifice in die plate 22. The advancing coagulating mixture is maintained under pressure by the cooperative action of interrupted worm flight segments 20 and breaker bolts 24. As the mixture advances and coagulates, successive breaker bolts increasingly engage the material and resist its advance, thereby producing back pressure in the upstream portion of the chamber. A constricted extruder exit in die plate 22 may also contribute to the back pressure in the extruder chamber. The pressure may be maintained until the material exits from the extruder, or the pressure may be relieved prior to the extruder exit, for example, by the escape of liquid from the extruder exit. In any event, the coagulating mixture is maintained under pressure in the extruder at least until coagulation of the polymer latex is substantially complete. As used herein "substantially complete" coagulation means the degree of coagulation at which the coagulated polymer exits from the extruder. Thus in accordance with the principles of this invention, substantially all coagulation takes place under pressure. This pressure is at least about 15 p.s.i.g., and may be substantially higher.

Screw 14 ends a short distance prior to die plate 22 to provide a compaction zone 48 in chamber 12 prior to the die plate. Die plate 22 is bolted to flange 42 on the downstream end of chamber 12 by bolts 44, only one of which is shown in detail in FIG. 1. Die plate 22 may have one or more exit orifices of any of a variety of sizes and shapes. The die plate preferably provides a constricted exit from the extruder to promote compaction of the coagulated polymer near the end of worm flight 20 and in compaction zone 48.

Figure 2:
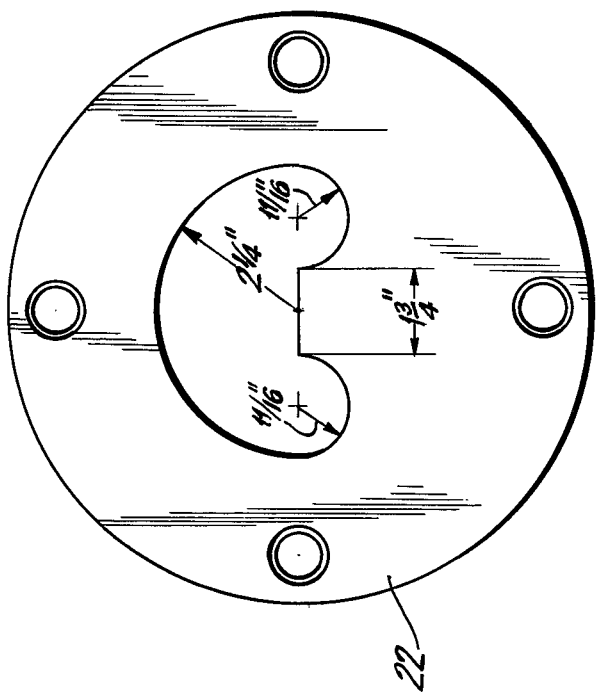
FIG. 2 shows a die plate suitable for use on the downstream end of the extruder of FIG. 1.

A die plate configuration found particularly suitable for use with an extruder having an inside barrel diameter of approximately $4\frac{1}{2}$ inches is shown in detail in FIG. 2. The upper portion of the orifice in this die plate (above the horizontal diameter of the plate as viewed in FIG. 2) is approximately a semicircle of radius $2\frac{1}{2}$ inches, and the lower portion of the orifice comprises two semicircles of radius 11/16 inch. The die plate has a land (thickness at the orifice) of approximately $\frac{1}{4}$ inch. The single relatively large orifice of this die plate was found to give good compaction of the coagulated polymer prior to extrusion from the apparatus. Other die plate configurations may, of course, be used.

In operation, screw 14 is rotated at a speed in the range of about 250–500 revolutions per minute. Depending on the latex being coagulated, particular speeds in this range may be preferred. For coagulation of an SBR latex in the $4\frac{1}{2}$ inch inside diameter extruder mentioned above, a speed in the range of about 250–400 revolutions per minute is preferred. For coagulation of a neoprene latex in the same extruder, a speed in the range of about 450–500 revolutions per minute is preferred.

The polymer latex and coagulant are introduced into the extruder under pressure as mentioned above. The latex may be a rubber latex as that term is defined above; a latex of a plastic polymer such as ABS resin; or a mixture or any other combination thereof such as ABS-extended SBR. The coagulant may be any suitable coagulant. Known coagulants include electrolytes such as acids, salts, and aqueous solutions of acids and salts. Suitable aqueous acids are aqueous $H_2SO_4$, $HCl$, $H_3PO_4$, $HC_2H_3O_2$, and the like. Aqueous $H_2SO_4$ is particularly preferred for coagulating rubber latices, particularly SBR. Suitable aqueous salt solutions are solutions of $Ca(NO_3)_2$, $Al_2(SO_4)_3$, $NaCl$, and the like. Other known coagulants are organic solvents such as ketones (e.g., acetone) and alcohols (e.g., ethyl alcohol, methyl alcohol, etc.), and mixtures thereof. Mixtures of electrolytes and organic solvents (e.g., an emulsion of an alcohol in an electrolyte) may also be used as coagulants.

The concentrations of polymer latex and of coagulant fed into the extruder are not critical, as long as there is at least sufficient coagulant to provide complete coagulation of the polymer. In general, however, the process of this invention makes it possible to reduce the amount of coagulant necessary for complete coagulation of the polymer. Preferably the mixture of polymer latex and coagulant in the extruder comprises about 25 to 40% by weight of polymer solids and about 60 to 75% by weight of coagulant.

The polymer latex and coagulant are mixed in the extruder by screw 14 to form a coagulating mixture. The coagulating mixture is advanced toward the constricted extrusion orifice in die plate 22 by screw 14. As the coagulating mixture advances, interrupted worm flight segments 20 and breaker bolts 24 cooperate to vigorously work the mixture and thoroughly intermingle the constituents of the mixture to contact all of the latex with coagulant and thereby assure complete coagulation of the latex. Highly turbulent conditions are induced in the mixture by the interrupted worm flight segments and breaker bolts. The back pressure produced by screw 14 advancing the coagulating mixture against the resistance provided by breaker bolts 24 insures that the constituents of the coagulating mixture are worked by the interrupted worm flight segments and breaker bolts and do not merely flow in a liquid-like manner around these elements. In particular, structures of coagulated polymer which might encapsulate or trap uncoagulated latex either do not form because of the turbulent mixing and working of the coagulating mixture, or if such structures form, they are worked and broken down by the action of the interrupted worm flights and breaker bolts to release any trapped latex for contact with coagulant. For this purpose, the sharp leading edges and blunt trailing edges of interrupted worm flight segments 20 and the small clearances between worm flight segments 20 and breaker bolts 24 are particularly effective. As mentioned above, the clearances between the leading and trailing portions of worm flight segments 20 and breaker bolts 24 are preferably chosen to be of the order of magnitude of or smaller than a typical diameter of a structure which might form in the coagulating mixture to encapsulate uncoagulated latex. Any such latex-encapsulating structure which is forced between the leading or trailing portion of a worm flight segment and an opposing breaker bolt is thereby broken down and the encapsulated latex is released.

At the end of screw 14 prior to die plate 22 the fully coagulated polymer is compacted and agglomerated and is extruded via the constricted extrusion orifice in die plate 22. The compaction of the coagulated polymer forces a substantial portion of the excess process liquid from the extruder via the extrusion orifice separately from the compacted coagulated polymer. This liquid drains freely from the extruded polymer. The extruded polymer is therefore characterized by relatively low moisture content, typically less than about 25% by weight. Moisture contents in the range of 15–25% by weight are most frequent. Also, the polymer solids content of the separately expressed excess process liquid is relatively low, typically about 0.5 to 1.5% by weight.

The coagulated polymer exiting from the extruder is ready for further processing in the conventional manner; it being understood that because of the relatively low moisture content of the polymer, certain dewatering steps may be eliminated. In addition, because of the more efficient use of the coagulant and the low moisture content of the extruded polymer, the pH of the extruded polymer can be more carefully controlled. Advantageously, the pH of the extruded polymer is such that extensive washing of the polymer is unnecessary. Typically the pH of the extruded polymer is in the range from about 6 to 8.

The following examples are provided as illustrations of the process of this invention and with no intention of limiting the invention thereto.

EXAMPLE I

In this example an extruder similar to that shown in FIG. 1 and having an inside diameter of 4½ inches and an inside length of approximately 4 feet was used. The outside diameter of worm shaft 16 was approximately 2½ inches. Die plate 22 was as shown in FIG. 2 and described above. Worm 14 was driven by a motor having approximately 75 horsepower.

The latex coagulated was an SBR latex known as "1018" and available from Polysar Limited, Sarnia, Ontario, Canada N7T 7M2. This latex has a nominal solids content of 30.2% by weight and a pH of 8.38. The coagulant used was 0.8 normal aqueous $H_2SO_4$. Both the latex and coagulant were supplied to the extruder at ambient temperature. The coagulant was introduced into the extruder near the upstream end of the extruder. The latex was introduced through the fifth breaker bolt (approximately 15 inches) from the downstream end of the extruder. The latex was supplied at a rate of approximately 12.5 pounds per minute and the coagulant was fed at a rate of about 3.5 pounds per minute. (Substantially higher latex feed rates are believed possible with this coagulant feed rate, but the latex feed rate was limited in the test apparatus by the capacity of the latex feed pump.) Worm 14 was rotated at slightly more than 300 revolutions per minute.

Coagulated rubber having a moisture content of about 15.5% was extruded at the rate of about 402 pounds per hour. The back pressure immediately prior to die plate 22 was approximately 20 p.s.i.g. The temperature of the extrudate was 90°–100° F. The excess process liquid was approximately 99% moisture and had a pH of approximately 1.6.

EXAMPLE II

In this example the extruder used was similar to that used in Example I. The latex coagulated was neoprene latex type M1 available from Petro-Tex Chemical Corporation, 8600 Park Place Blvd., Houston, Tex. 77017, having a nominal solids content of 37.7% and a pH of 12.30. The coagulant was an aqueous solution of 1.7% $Ca(NO_3)_2$ and 0.4% $Al_2(SO_4)_3$. The coagulant was introduced into the extruder through the second breaker bolt from the upstream end of the extruder, and the latex was introduced through the third breaker bolt from the upstream end. Both coagulant and latex were supplied at ambient temperature and at flow rates of 4.28 and 6.0 pounds per minute, respectively.

Worm 14 was rotated at approximately 475 revolutions per minute. The back pressure just prior to die plate 22 was approximately 40 p.s.i.g. The temperature of the extrudate was approximately 123° F. Complete coagulation took place to form rubber crumb which was discharged from the extruder with a moisture content of about 17%. The excess process liquid was approximately 1.4% solids and had a pH of about 7.3.

EXAMPLE III

In this example the extruder used was similar to that used in the preceding examples. The latex coagulated was an SBR latex known as "1502" available from Goodyear Tire & Rubber Company, 1144 East Market Street, Akron, Ohio 44316. This latex has a nominal solids content of 30% by weight and a pH of 8.2. The coagulant was 0.6N $H_2SO_4$. The coagulant was introduced into the extruder through the second breaker bolt from the upstream end of the extruder in each of the two rows of breaker bolts, and the latex was introduced through the third breaker bolt from the upstream end in each of the two rows of breaker bolts. Both the latex and coagulant were introduced at ambient temperature. The coagulant flow rate was 12.5 to 21 pounds per minute and the latex flow rate was 95 pounds per minute.

Worm 14 was rotated at approximately 175 revolutions per minute. The back pressure prior to die plate 22 was 30 to 35 p.s.i.g. Coagulated rubber was extruded at approximately 28 pounds per minute with a moisture content of approximately 30% and a temperature of approximately 95° F. The excess process liquid was approximately 1.5% solids and had a pH of about 1.4.

What is claimed is:

1. The process of coagulating a polymer latex comprising mixing and mechanically working the polymer latex and a coagulant under pressure in an extruder to produce a coagulated polymer having moisture content less than 25% by weight, the extruder including an elongated chamber, an axial rotating interrupted worm flight disposed in the chamber for initially contacting and mixing the polymer latex and coagulant in the worm flight to form a coagulating mixture and for advancing the coagulating mixture through the chamber to an extruder exit, and a plurality of stationary breakers projecting into the interior of the chamber intermediate at least some of the segments of the interrupted worm flight, the interrupted worm flight and the breakers cooperating to maintain the coagulating mixture under pressure in the worm flight at least until coagulation of the polymer latex is substantially complete, the segments of the interrupted worm flight and the breakers also cooperating to turbulently mix and mechanically work the constituents of the pressurized coagulating mixture in the worm flight and to break up any coagulated polymer encapsulating uncoagulated polymer latex and release the encapsulated polymer latex for mixture with coagulant, and extruding the coagulated polymer from the extruder exit with a moisture content less than 25% by weight.

2. The process defined in claim 1 wherein the polymer latex is a rubber latex.

3. The process defined in claim 2 wherein the rubber latex is selected from the group consisting of a styrene-butadiene rubber, a polychloroprene rubber, an acrylonitrile-butadiene rubber, and mixtures thereof.

4. The process defined in claim 1 wherein the coagulant is selected from the group consisting of an electrolyte, an organic solvent, and mixtures thereof.

5. The process defined in claim 1 wherein the coagulant is selected from the group consisting of an aqueous salt solution, an aqueous acid, and mixtures thereof.

6. The process defined in claim 1 wherein the coagulant is aqueous $H_2SO_4$.

7. The process defined in claim 1 wherein the coagulant is selected from the group consisting of a ketone, an alcohol, and mixtures thereof.

8. The process defined in claim 1 wherein the coagulating mixture is maintained at a pressure of at least about 15 p.s.i.g.

9. The process defined in claim 1 wherein the interrupted worm flight is rotated at a speed in the range from 250 to 500 revolutions per minute.

10. The process defined in claim 1 wherein the polymer latex is a styrene-butadiene rubber and the interrupted worm flight is rotated at a speed in the range from about 250 to 400 revolutions per minute.

11. The process defined in claim 1 wherein the polymer latex is a polychloroprene rubber and the interrupted worm flight is rotated at a speed in the range from about 450 to 500 revolutions per minute.

12. The process defined in claim 1 wherein the polymer latex is a styrene-butadiene rubber having a solids content in the range from about 20 to 35% by weight, wherein the coagulant is aqueous $H_2SO_4$, and wherein the coagulating mixture is maintained at a pressure of at least about 15 p.s.i.g.

13. The process of coagulating a polymer latex comprising the steps of:

introducing separate streams of the polymer latex and a coagulant into the spaces between the upstream segments of a rotating interrupted worm flight axially disposed in an elongated pressurized chamber to form a pressurized coagulating mixture in the spaces between the worm flight segments in the chamber;

advancing the coagulating mixture from the upstream portion of the chamber through the spaces between the worm flight segments to the downstream portion of the chamber by rotation of the interrupted worm flight disposed in the chamber;

maintaining the advancing coagulating mixture under pressure in the spaces between the worm flight segments at least until coagulation of the polymer latex is substantially complete by cooperation of the segments of the interrupted worm flight and a plurality of fixed breakers projecting into the spaces intermediate at least some of the segments of the interrupted worm flight;

turbulently mechanically working the pressurized coagulating mixture in the spaces between the worm flight segments to thoroughly and intimately mix the constituents of the mixture and to release any uncoagulated polymer latex which has been encapsulated by coagulated polymer by cooperation of the segments of the interrupted worm flight and the fixed breakers to produce a coagulated polymer having moisture content less than 25% by weight; and extruding the coagulated polymer from the chamber by way of an exit in the downstream portion of the chamber.

14. The process defined in claim 13 wherein the coagulating mixture is maintained at a pressure of at least about 15 p.s.i.g.

15. The process defined in claim 13 wherein the interrupted worm flight is rotated at a speed in the range from 250 to 500 revolutions per minute.

16. The process defined in claim 13 further comprising the step of compacting the coagulated polymer in the chamber prior to extruding it from the exit.

* * * * *